(12) United States Patent
Saha et al.

(10) Patent No.: US 11,947,192 B2
(45) Date of Patent: Apr. 2, 2024

(54) CONTACT LENSES WITH MICROCHANNELS

(71) Applicant: CooperVision International Limited, Fareham (GB)

(72) Inventors: Sourav Saha, Pleasanton, CA (US);
Victoria Rogers, Pleasanton, CA (US);
Charles B. Derringer, Livermore, CA (US); Sarah Tao, Pleasanton, CA (US);
Szeshen Chuah, Hayward, CA (US);
Yuan Sun, Pleasanton, CA (US);
Yuwen Liu, Dublin, CA (US); Nancy Keir, Pleasanton, CA (US); Tim Warren, Dublin, CA (US); Matthew S. Linn, Castro Valley, CA (US); Lu Jiang, Pleasanton, CA (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 0 days.

(21) Appl. No.: 18/075,444

(22) Filed: Dec. 6, 2022

(65) Prior Publication Data

US 2023/0107664 A1 Apr. 6, 2023

Related U.S. Application Data

(63) Continuation of application No. 16/884,077, filed on May 27, 2020, now Pat. No. 11,550,166.
(Continued)

(51) Int. Cl.
*G02C 7/04* (2006.01)
*G02B 1/04* (2006.01)

(52) U.S. Cl.
CPC .............. *G02C 7/04* (2013.01); *G02B 1/043* (2013.01)

(58) Field of Classification Search
CPC .......... G02C 7/04; G02C 7/047; G02B 1/043; B29D 11/00134; B29D 11/00076; B29D 11/00096
(Continued)

(56) References Cited

U.S. PATENT DOCUMENTS

| 5,009,497 A | 4/1991 | Cohen |
| 5,347,326 A | 9/1994 | Volk |

(Continued)

FOREIGN PATENT DOCUMENTS

| CN | 2784965 Y | 5/2006 |
| CN | 103415802 A | 11/2013 |

(Continued)

OTHER PUBLICATIONS

Search Report issued in corresponding United Kingdom Patent Application No. GB2008468.7 dated Dec. 4, 2020 (5 pages).
(Continued)

*Primary Examiner* — William R Alexander
(74) *Attorney, Agent, or Firm* — Kilyk & Bowersox, P.L.L.C.

(57) ABSTRACT

A contact lens comprising one or more microchannels for transport of liquid through the lens is provided. The contact lens can be made by contacting a curable composition with a microfiber that is insoluble in the curable composition; curing the curable composition to provide a polymeric lens body with the microfiber embedded therein; and contacting the polymeric lens body with a solvent to dissolve the microfiber.

20 Claims, 5 Drawing Sheets

Related U.S. Application Data (60) Provisional application No. 62/857,391, filed on Jun. 5, 2019.

(58) Field of Classification Search
USPC .................................................. 351/159.02
See application file for complete search history.

(56) References Cited

U.S. PATENT DOCUMENTS

| | | | |
|---|---|---|---|
| 6,036,314 A * | 3/2000 | Wolfson | G02C 7/04 351/159.02 |
| 6,160,030 A | 12/2000 | Chaouk et al. | |
| 6,726,322 B2 | 4/2004 | Andino et al. | |
| 6,779,888 B2 | 8/2004 | Marmo | |
| 6,886,936 B2 | 5/2005 | Marmo et al. | |
| 8,087,777 B2 | 1/2012 | Rosenthal | |
| 8,524,850 B2 | 9/2013 | Ueyama et al. | |
| 8,865,789 B2 | 10/2014 | Yao et al. | |
| 9,278,489 B2 | 3/2016 | Goodenough et al. | |
| 9,636,016 B1 | 5/2017 | Etzkorn et al. | |
| 9,910,296 B2 | 3/2018 | Harant et al. | |
| 9,956,168 B2 | 5/2018 | Davis et al. | |
| 10,139,522 B2 | 11/2018 | Marullo et al. | |
| 2013/0043609 A1 | 2/2013 | Suzuki et al. | |
| 2013/0161846 A1 | 6/2013 | Goodenough et al. | |
| 2013/0278890 A1 * | 10/2013 | de Juan, Jr. | G02C 7/049 351/159.04 |
| 2014/0005514 A1 | 1/2014 | Pugh et al. | |
| 2014/0022506 A1 | 1/2014 | Hong et al. | |
| 2014/0377327 A1 | 12/2014 | Davis et al. | |
| 2015/0004058 A1 | 1/2015 | Yao et al. | |
| 2015/0055081 A1 * | 2/2015 | de Juan, Jr. | G02C 7/049 351/159.04 |
| 2015/0077701 A1 * | 3/2015 | de Juan, Jr. | G02C 7/022 351/159.04 |
| 2016/0018671 A1 * | 1/2016 | Waite | A61P 37/08 351/159.04 |
| 2016/0066825 A1 | 3/2016 | Barrows et al. | |
| 2016/0370603 A1 * | 12/2016 | de Juan, Jr. | G02C 7/047 |
| 2017/0038604 A1 * | 2/2017 | de Juan, Jr. | G02C 7/048 |
| 2017/0131571 A1 | 5/2017 | Waite et al. | |
| 2017/0280997 A1 | 10/2017 | Lai et al. | |
| 2017/0307779 A1 | 10/2017 | Marullo et al. | |
| 2017/0315381 A1 * | 11/2017 | de Juan, Jr. | G02C 7/047 |
| 2018/0113325 A1 | 4/2018 | Chien | |
| 2018/0161149 A1 | 6/2018 | Litvin | |
| 2018/0215088 A1 | 8/2018 | Leng et al. | |
| 2020/0387009 A1 | 12/2020 | Saha et al. | |
| 2022/0326546 A1 * | 10/2022 | Alster | G02C 7/085 |
| 2022/0390763 A1 * | 12/2022 | de Juan, Jr. | G02C 7/047 |

FOREIGN PATENT DOCUMENTS

| | | |
|---|---|---|
| CN | 206411351 U | 8/2017 |
| CN | 107811751 A | 3/2018 |
| CN | 109288619 A | 2/2019 |
| CN | 108628001 B | 8/2019 |
| EP | 2540261 A1 | 1/2013 |
| EP | 3653183 A1 | 5/2020 |
| GB | 2401954 A | 11/2004 |
| JP | S56161436 A | 12/1981 |
| TW | 201816469 A | 5/2018 |
| WO | 0227389 A1 | 4/2002 |

OTHER PUBLICATIONS

Further Search Report issued in corresponding United Kingdom Patent Application No. GB2008468.7 dated Apr. 14, 2021 (3 pages).
Office Action issued in corresponding Taiwan Patent Application 109118918 dated Aug. 2, 2023 (with English translation)(17 pages).
International Search Report and Written Opinion issued in corresponding International Patent Application No. PCT/GB2020/051363 dated Nov. 9, 2020 (23 pages).
Stephenson et al., "Generalizing Murray's law: An optimization principle for fluidic networks of arbitrary shape and scale," Journal of Applied Physics, 2015, vol. 118, No. 174302 (8 pages).

* cited by examiner

CONTACT LENSES WITH MICROCHANNELS

This application is a continuation of U.S. patent application Ser. No. 16/884,077 filed May 27, 2020, which in turn claims the benefit under 35 U.S.C. § 119(e) of prior U.S. Provisional Patent Application No. 62/857,391, filed Jun. 5, 2019, which is incorporated in its entirety by reference herein.

FIELD

The field of the invention relates to the manufacture of contact lenses with microchannels.

BACKGROUND

Evaporative water loss from the front (anterior) surface of a hydrogel contact lens surface can result in contact lens dehydration, which in turn can lead to depletion of post-lens tear film and cause discomfort. Consequently, many contact lens wearers use rewetting drops to temporarily ease discomfort and dryness. However, most of the eye drop liquid tends to reside in the lower tear meniscus and has a relatively short residence time before it gets drained. Thus, drops are rarely able to provide sustained comfort and relief of symptoms over the wearing day and need to be frequently instilled.

Background publications include U.S. Pat. Nos. 5,009,497, 6,160,030, 6,726,322, 6,779,888, 6,886,936, 8,087,777, 9,278,489, 9,910,296, 9,956,168, U.S. Publ. No. 2013/0043609, U.S. Publ. No. 2017/0131571, PCT Publ. No. WO2002/027389, GB Pat. No. 2,401,954, and EP Pat. No. 2,540,261.

SUMMARY

Contact lenses are provided that comprise microchannels and/or reservoirs for providing prolonged moisture or sustained delivery of beneficial agents to a wearer's eyes. In one example, the contact lens comprises a bulk polymer material defined by a front surface, a back surface, and a circumferential edge, and a microchannel embedded within the bulk polymer material having a first opening located within 2 mm of the circumferential edge or on the circumferential edge, and wherein the microchannel is fluidly connected to a second opening on the front surface or on the back surface, wherein the second opening is located more than 2 mm away from the circumferential edge. In a specific example, the microchannel is branched. In a further example, the microchannel is fluidly connected to a reservoir. In some examples, the reservoir contains a liquid comprising hydroxyethyl cellulose, polyvinylpyrrolidone, polyvinyl alcohol, and/or hyaluronic acid.

Such contact lenses may be manufactured by contacting a curable composition with a dissolvable material that is insoluble in the curable composition and that has the shape of the desired microchannel and/or reservoir, curing the curable composition to provide a polymeric lens body with the dissolvable material embedded therein, and contacting the polymeric lens body with a solvent that dissolves the material.

In one example, the method comprises double casting in which a first portion of the curable composition is cured in a first contact lens mold assembly comprising a male mold member and a female mold member. The mold assembly is opened to provide a cured polymer having one surface adhered to either the male mold member or the female mold member and an opposite exposed surface. A dissolvable material that is insoluble in the curable composition is placed or formed on the exposed surface of the cured polymer, and a second portion of the curable composition is cured in a second contact lens mold assembly comprising the mold member to which the cured polymer is adhered and a complementary mold member. The second mold assembly is disassembled to provide a polymeric lens body comprising the dissolvable material embedded therein, and contacted with a solvent that dissolves the dissolvable material.

In a specific example, one of the mold members of the first contact lens mold assembly comprises a raised structure on its molding surface that defines a cavity on the exposed surface of the cured polymer having the desired microfiber and/or reservoir shape. The cavity is filled with a dissolvable material that is insoluble in the curable composition. A second portion of the curable composition is cured in a second contact lens mold assembly comprising the mold member to which the cured polymer is adhered and a complementary mold member to provide the polymeric lens body comprising the dissolvable material embedded therein.

DETAILED DESCRIPTION

Described herein are methods of manufacturing a contact lens comprising microchannels that can transport liquid from the cul de sac or lower tear meniscus of the eye of a contact lens wearer through the contact lens bulk (i.e. the interior of the contact lens) to the front or back surface of the contact lens at a location of the contact lens that is not in contact with the lower tear meniscus. In this way, moisture is provided to a contact lens surface that is not in direct contact with the cul de sac or lower tear meniscus of the contact lens wearer, thereby counteracting the effects of evaporative water loss from the front surface of the contact lens. Optionally, the microchannels may be connected to reservoirs within the contact lens bulk that are filled with a solution of comfort molecule or another beneficial agent. The microchannels may transport eye drops into the bulk of the contact lens to improve residence time when the contact lens is worn. In addition, or as an alternative to evaporation-driven capillary flow, eyelid pressure-driven peristaltic pumping during blinking may also transport liquid from the lower tear meniscus through microchannels within the contact lens bulk to the front or back surface of the contact lens. As used herein, the "back surface" of a contact lens, which is sometimes called the "posterior surface," refers to the concave portion of the contact lens that is in contact with the cornea when the contact lens is worn. Conversely, the "front surface," which is sometimes called the "anterior surface," refers to the convex surface of the contact lens, which is sometimes also referred to as the "anterior surface". As used herein, the "edge" (sometimes also referred to as the "circumferential edge") of a contact lens refers to the circumferential region of the contact lens where the front and back surfaces converge.

A method of manufacturing a contact lens comprising at least one microchannel may comprise contacting a curable composition for forming a contact lens with a microfiber that is insoluble in the curable composition and curing the composition to provide a polymeric lens body with the microfiber embedded therein. A curable composition is a liquid composition comprising polymerizable molecules (i.e. "monomers") and/or cross-linkable polymers that when subject to curing conditions, such as thermal curing or UV curing, form a plastic material. As used herein, a "polymeric lens body" refers to a lens-shaped polymeric material. In some examples, a curable composition may be cured in a mold for forming a contact lens, as described in more detail below. In other examples, a curable composition may be formed into a rod or other shape that is lathed to provide a polymeric lens body. The polymeric lens body is typically subjected to further processing, such as washing to remove any unreacted components from the polymeric lens body and, in the case of hydrogel contact lenses, to hydrate the contact lens material to provide an opthalmically-acceptable contact lens. As used herein, the term "embedded" means that at least a portion of the microfiber is fully enveloped by the polymeric lens body. The portion of the microfiber that can be embedded within the polymer of the lens body can be at least 10% of the external surface area of the microfiber, at least 20%, at least 30%, at least 40%, at least 50%. In some examples, from about 50%, 60%, or 70% and up to about 90%, 95%, 99%, or 100% of the microfiber is embedded within the polymeric lens body. The polymeric lens body with microfiber embedded therein is contacted with a solvent capable of dissolving the microfiber for a period of time sufficient to at least partially dissolve the microfiber to provide a contact lens comprising a bulk polymer material with a microchannel embedded therein. Thus, the microchannel comprises a tunnel-like structure within the contact lens bulk as opposed to a channel or groove that is present only on the surface of the contact lens (see e.g. U.S. Pat. No. 6,779,888).

As used herein, the term "microfiber" refers to any fiber having a diameter of less than 1 millimeter, and thus includes nanofibers having diameters of less than 1 micron. Typically, the microfiber has a length that is at least 4 times that of the diameter. In some examples, the microfiber diameter may be constant along the length of the microfiber. In other examples, the microfiber diameter may vary across the length of the microfiber. The microfiber can have any cross-sectional geometrical shape, including retangular, oblong, triangular and the like. In such non-cylindrical shapes, the cross-sectional area can be equivalent to the diameter ranges provided herein. In one example, the diameter of the microfiber may be tapered, with the diameter gradually decreasing from one end of the microfiber to the other end of the microfiber. In various examples, the microfiber has a diameter or average diameter (if the diameter is not constant) of from about 100 nm, 250 nm, 500 nm, 1 µm, 5 µm, or 10 µm, up to about 50 µm, 75 µm, 100 µm, or 250 µm. In a specific example, the microfiber has an average diameter of from about 500 nm to 50 µm. Throughout this disclosure when a series of lower limit ranges and a series of upper limit ranges are listed, all combinations of the listed ranges are contemplated as if each combination were specifically listed. For example, in the above listing of microfiber diameters, all 34 possible diameter ranges are contemplated (i.e. 100 nm to 50 µm, 100 nm to 75 µm, etc., 10 µm to 100 µm, and 10 µm to 250 µm).

References herein to "an example" or "a specific example" or similar phrase, are intended to introduce a feature or features of the microfiber, the microchannel-containing contact lens, or method of manufacturing the microchannel-containing contact lens (depending on context) that can be combined with any combination of previously-described or subsequently-described examples (i.e. features), unless a particular combination of features is mutually exclusive, or if context indicates otherwise. Further, as used in this specification, the singular forms "a," "an," and "the" include plural referents (e.g. at least one or more) unless the context clearly dictates otherwise. Thus, for example, reference to a "contact lens" includes a single lens as well as two or more of the same or different lenses. A reference to a "microchannel" refers to a single microchannel as well as two or more of the same or different microchannels, and the like. In some examples, the contact lens comprises at least 10, 25, 50, 100, 200 or 500 microchannels.

When more than one microfiber or microchannel is present in the lens, as an option, the microfibers or microchannels do not intersect with each other and/or overlap with each other and/or contact one another except through the optional presence of a reservoir. In other examples, a microchannel may be a "branched microchannel" in that it is fluidly connected to one or more additional microchannels. In some examples, no microchannels are present inside the optic zone of the contact lens. In other examples, microchannels may be present in the optic zone, particularly when the configuration and density of the microchannels are such that optical clarity or vision correction is not significantly impacted.

The microfiber is comprised of a material that is insoluble in the curable composition for forming the contact lens so that the dimensions of the microfiber are maintained or substantially maintained (e.g. dimensions are within 10% of the pre-cured dimension) when the contact lens is cured. A microfiber material is considered insoluble in the curable composition if a solid 10 mm×100 µm disk consisting of the material changes diameter by no more than ±20% after soaking in the curable composition for 1 hour at room temperature (20-25° C.), where percent change in diameter is calculated by the equation $((D_{final}-10)/10)*100$, and where $D_{final}$ is the diameter of the disk measured (in mm) after it is removed from the curable composition. In specific examples, the microfiber material that has a percent change in diameter of less than about 15%, less than about 10%, or less than about 5%, or less than about 1% as measured using the above test.

The microfiber may comprise a water-soluble polymer. Examples of water-soluble polymers include mucopolysaccharides (e.g. pullulan, hyaluronic acid, and chondroitin sulfate), cellulose, pectin, alginic acid, methyl cellulose, hydroxypropyl cellulose, hydroxypropylmethyl cellulose, hydroxyethyl cellulose, polyvinyl alcohol, polyvinylpyrrolidone, polyethylene oxide, and combinations thereof. In a specific example, the microfiber comprises polyvinyl alcohol. As used herein, the term "polyvinyl alcohol" (PVOH) encompasses unhydrolyzed, partially and/or fully hydrolyzed polymers and copolymers of vinyl acetate. In specific examples, the polyvinyl alcohol is at least 96%, 98%, or 99% hydrolyzed. A variety of polyvinyl alcohol copolymers suitable for forming microfibers are commercially available.

In one example, the polyvinyl alcohol is a copolymer of vinyl alcohol and butanediol, such as Nichigo G-Polymer™ from Nippon Gohsei.

The microfiber may be provided as a non-woven mesh. Non-woven microfiber meshes may be prepared by forming a film of a polymer or a polymer blend by wet spinning, dry spinning, melt spinning, electrospinning, or other suitable method. Examples of commercially-available non-woven microfiber meshes are disclosed in Example 1 below.

Conventional cast molding methods may be used in the manufacture of a contact lens comprising microchannels. Typically in the manufacture of a cast-molded contact lenses, a curable composition is dispensed into a female mold member having a concave surface that defines the front surface of the contact lens. A male mold member having a convex surface that defines the back surface of the contact lens, i.e. the cornea-contacting surface, is combined with the female mold member to form a contact lens mold assembly that is subjected to curing conditions, such as UV or thermal curing conditions, under which the curable composition is formed into a polymeric lens body. The mold assembly is disassembled (i.e. demolded) and the polymeric lens body is removed and optionally subjected to further processing, such as extraction and hydration, to form an ophthalmically-acceptable contact lens. Exemplary methods of manufacturing silicone hydrogel contact lenses are described in U.S. Pat. No. 8,865,789.

One example of a cast molding method for manufacturing a contact lens comprising microchannels comprises predosing a contact lens mold with a portion of a curable composition, optionally curing or partially curing the curable composition, and placing micofibers on the curable or cured composition. As used herein, references to curing a composition or to a cured composition encompass both partial and complete curing, or a composition that is incompletely or completely cured, respectively, unless context dictates otherwise. The microfibers placed on the predosed composition may be in the form of a non-woven microfiber mesh. The mold is then dosed with the remaining curable composition and cured to form a polymeric lens body with the microfiber embedded therein. The portion of curable composition predosed in the contact lens mold can be from about 0% by weight to about 90 wt. % or 20 wt. % to 60 wt. % of the total weight amount of curable composition used for forming the polymeric lens body.

In other examples, the microfiber may be formed by 2D or 3D printing methods, such as by fused deposition modeling, inkjet printing, laser-induced forward transfer, and micro-extrusion. In one example the microfiber is printed directly onto a contact lens mold prior to filling the mold with the curable composition. In another example, the contact lens mold is predosed with a portion of curable composition and cured. The microfiber is then printed on the cured composition (i.e. the cured polymer). The mold is then dosed with the remainder of the curable composition and further subjected to curing conditions to provide a polymeric lens body with the microfiber embedded therein. In other examples, a microfiber structure may be pre-printed and positioned in a contact lens mold.

In some examples, prior to placing the microfiber material in the contact lens mold, it may be presoaked in the curable composition or another composition in which the microfiber material is insoluble to degas the microfiber material before it is positioned within the contact lens mold, thereby reducing the possibility that air bubbles will form in the polymeric lens body during curing.

Another method of forming microchannels in a contact lens employs a double casting method. In a first cast, a portion of a curable composition is cured in a first contact lens mold assembly. The mold assembly is open to provide a cured polymer that is adhered to either the male mold member or the female mold member. Thus, one surface of the cured polymer is adhered to a mold member, and the opposite surface of the cured polymer is exposed. A microfiber is placed or formed on at least a portion of the exposed surface of the cured polymer. In the second cast, the mold member to which the cured polymer is adhered is combined with a second complementary mold member. Thus, for example, if the cured polymer is adhered to the female mold member used in the first cast, the second mold assembly (i.e. the mold assembly of the second cast) will comprise the female mold member from the first cast and a new male mold member. Conversely, if the cured polymer is adhered to the male mold member used in the first cast, the second mold assembly will comprise the male mold member from the first cast and a new female mold member. In the second cast, the remaining portion of the curable composition is dispensed in the female mold member used in the second cast and closed with the male mold member to form the second mold assembly, which is subject to curing conditions to form a polymeric lens body with the microfiber embedded therein.

In one example of a double casting method, the first portion of the curable composition is cured in a contact lens mold that comprises raised microstructures on a molding surface of the male or female mold member. The mold member comprising the raised microstructures on its molding surface is selected to be the mold member to which the cured polymer is not adhered when the mold assembly is opened after the first cast. Consequently, the surface of the cured polymer that is exposed when the first contact lens mold assembly is opened will comprise microchannels. The microchannels may be filled with a microfiber-forming material, such as by any of the 2D or 3D printing methods mentioned above. A second cast molding is performed as described above using a second mold assembly comprising the mold member to which the cured polymer from the first cast is adhered and a second, complementary mold member to result in a polymeric lens body comprising embedded microfibers. In some examples of double casting methods, the first cast may comprise using a first curable composition, and the second cast may comprise using a second curable composition that differs from the first curable composition. Thus, the resulting polymeric lens body will comprise two different polymers, with a first polymer comprising the posterior surface of the polymeric lens body, a second polymer comprising the anterior surface of the polymeric lens body, and microfibers embedded therein. In some examples, the microfiber-forming material may itself comprise a curable composition that cures during the second cast to form the microfibers embedded within the polymeric lens body. A double casting method for forming contact lenses with embedded microchannels is described further below in reference to FIG. 5.

A microchannel may also be formed by laser ablation techniques in which a focused laser beam selectively ablates the polymeric lens body. Combinations of techniques may be used to form a microchannel embedded within a contact lens. For example, a microfiber may be embedded within a polymeric lens body by any of the above-described cast molding methods and then a front surface, back surface, or edge of the polymeric lens body may be selectively ablated to form a microchannel having an opening on a surface or edge of the polymeric lens body and extending to a microfiber within the bulk of the polymeric lens body. The polymeric lens body can then be washed in a solvent that dissolves the microfiber to provide a contact lens comprising a microchannel embedded within the contact lens bulk that is fluidly connected to an opening on a front surface, back surface, or the edge of the contact lens.

A contact lens with an embedded microchannel may have a feature for orienting the contact lens so that at least one microchannel opening contacts liquid residing at the lower eyelid margin during wear. In one example, the contact lens may comprise a visible mark that indicates how the contact lens should be oriented when it is placed on the wearer's eye to ensure the microchannel opening is at the lower eyelid margin. In another example, the contact lens may comprise a ballast design in which the bottom portion of the contact lens is thicker than the top portion, causing the contact lens to automatically orient itself into the proper position once placed on the eye. Additional lens designs are known in the art that allow the contact lens to self-orient when it is placed on the eye. In some examples, a contact lens does not have any orienting feature and may freely rotate on the eye during wear. In one such example, a contact lens may comprise an array of microchannels radiating from or near the optic zone to openings at or near the edge of the contact lens to ensure that liquid residing at the lower eyelid margin can be taken up by a microchannel embedded in the contact lens regardless of the orientation on the contact lens on the eye.

The contact lens may be formed from any suitable curable composition that does not solubilize or substantially solubilize the microfiber. In some examples, the curable composition comprises at least one siloxane (i.e. a molecule containing at least one Si—O group). Examples of siloxane-containing materials useful for contact lenses includes silicone hydrogels and silicone elastomers. In some examples, the contact lens may be a hybrid contact lens comprising both a silicone hydrogel material and a silicone elastomer material (see e.g. U.S. Pat. No. 10,139,522).

A curable composition for a silicone hydrogel may comprise a mixture of monomers comprising at least one siloxane monomer and at least one hydrophilic monomer. As used herein, a "monomer" refers to any molecule comprising a polymerizable group capable of reacting with other monomers that are the same or different, to form a polymer or copolymer. Thus, the term encompasses polymerizable prepolymers and macromers. Exemplary hydrophilic monomers include N-vinyl-N-methyl acetamide (VMA), N-vinyl pyrrolidone (NVP), 1,4-butanediol vinyl ether (BVE), ethylene glycol vinyl ether (EGVE), diethylene glycol vinyl ether (DEGVE), and combinations thereof. Exemplary siloxane monomers are those used in the following FDA-approved silicone hydrogel materials: comfilcon A, fanfilcon A, stenfilcon A, senofilcon A, senofilcon C. somofilcon A, narafilcon A, delefilcon A, narafilcon A, stenfilcon A, lotrafilcon A, lotrafilcon B, balafilcon A, samfilcon A, galyfilcon A, and asmofilcon A. In a specific example, the curable composition comprises about 10 wt. %, 20 wt. %, 30 wt. % or 40 wt. % up to about 50 wt. %, 60 wt. %, or 70 wt. % of NVP, VMA, or a combination of NVP and VMA, where weight percent is based on the total weight of the monomer(s) (i.e. VMA+NVP) in the curable composition relative to the total weight of all monomers in the composition. The curable composition comprising NVP and/or VMA may further comprise about 10 wt. %, 20 wt. %, 30 wt. % or 40 wt. % up to about 50 wt. %, 60 wt. %, or 75 wt. % of a siloxane monomer. Methods for forming silicone hydrogel contact lenses are well known in the art (see e.g. U.S. Pat. Nos. 8,865,789 and 8,524,850). In a specific example, the contact lens comprises a silicone hydrogel and the microfiber comprises a water-soluble polymer.

In the case of a hydrogel contact lens, such as a silicone hydrogel, the bulk polymer material may have an equilibrium water content (EWC) of at least 25 wt. %, 30 wt. %, or 40 wt. % up to about 60 wt. %, 70 wt. %, or 80 wt. %. To measure EWC of a bulk polymer material comprising a hydrogel, a control contact lens is made without the microchannel(s) and optional reservoir(s) but is otherwise identical in that the same bulk polymer material, curing and washing conditions are used as for the microchannel-containing lens. The test contact lens is fully hydrated and weighed, then completely dried in an oven at 80° C. under a vacuum and weighed again. The weight difference is determined by subtracting the weight of the dry lens from the weight of the fully hydrated lens. The wt. % EWC of the bulk polymer material is =(weight difference/hydrated weight)×100. In various examples, the bulk polymer material may have an EWC of about 25 to 45 wt. %, 40 to 55 wt. % or 50 to 75 wt. %. In some examples the bulk polymer material of the contact lens comprises a hydrogel, and the EWC of the contact lens, when the microchannel and optional reservoir are filled with water (i.e. are fully hydrated), is at least 1%, 5% or 10% and up to 20%, 25%, or 30% greater than the EWC of the control lens as described above.

In some examples, the contact lens may comprise a silicone elastomer. Silicone elastomers, which are also referred to in the art as silicone rubbers, are materials based on polyorganosiloxanes, such as, for example, polydimethylsiloxanes (PDMS). Curable compositions for silicone elastomers are commercially available and may be cured in accordance with the manufacturer's specifications. Suitable curable compositions for silicone elastomers include MED6015, MED 6755 and MED6033, from NuSil Technology, and SYLGARD™ from Dow Corning. The curable composition for a silicone elastomer does not typically comprise any hydrophilic components. Consequently, the resulting silicone elastomer typically has a water content less than 1 wt. %. In some examples, the silicone elastomer has a water content less than 0.5 wt. %, or less than 0.3 wt. %, or contains no measurable water (i.e. 0 wt. %).

After washing, and any other post-curing processing step, the contact lens is typically placed into a blister package, glass vial, or other appropriate container, all referred to herein as "packages." Contact lenses made from hydrogel materials are typically packaged together with a packaging solution, such as a phosphate- or borate-buffered saline. A packaging solution may optionally contain additional ingredients such as a comfort agent, a hydrophilic polymer, a surfactant or other additive. In some examples, the contact lens may be packaged dry, i.e. without any packaging solution. Dry packaging may be desirable if the contact lens microchannel and/or reservoir, described further below, comprises a beneficial agent which would elute from the contact lens if packaged with a packaging solution. The package is sealed, and the sealed contact lens is sterilized by sterilizing amounts of radiation, including heat or steam, such as by autoclaving, gamma radiation, e-beam radiation, ultraviolet radiation, etc. The final product is a sterile, packaged ophthalmically-acceptable contact lens comprising one or more microchannels.

In some examples, the microchannel that results from dissolving the microfiber may retain some or all of the microfiber material in soluble form. In other examples, the microfiber material may be washed out or substantially washed out of the microchannels. For example, the microchannel may contain the same liquid as the contact lens packaging solution. In some examples, the microfiber used to form the microchannel comprises a beneficial agent that remains in the microchannel after the microfiber is dissolved. The beneficial agent may slowly elute from the microchannel when the contact lens is worn by a patient. In one example, the microfiber comprises hyaluronic acid (HA), which can be effective in treating symptoms of dry eye. When the contact lens is worn by a patient, solubilized HA can slowly elute from the microchannel to the eye of the contact lens wearer thereby increasing the duration of time that a lens can be comfortably worn. In some examples, the HA has an average molecular weight of at least 500K, or 750K, or 1M, or 1.5M, or 2M, up to about 3M, 4M, or 5M, and may be optionally cross-linked. Cross-linked HA may swell when contacted with water, and in some cases may cause the contact lens to distort if it swells at a faster rate and/or to a greater extent than the contact lens bulk material. To prevent distortion, a microfiber comprising cross-linked HA may additionally comprise a "filler" polymer that has little to no swelling in water, thereby reducing the overall swelling factor of the microfiber. In one example, the filler polymer is selected from hydroxyethyl cellulose, polyvinylpyrrolidone, and polyvinyl alcohol.

Other non-limiting examples of beneficial agents that may be incorporated into the microfiber material for elution during contact lens wear include antimicrobial agents, anti-allergy agents, pharmaceuticals agents, and diagnostic agents.

A contact lens comprising a microchannel may additionally comprise a reservoir which, as used herein, refers to a defined cavity within the contact lens bulk that can retain liquid. The reservoir may be fluidly connected to a microchannel and have a diameter larger than the diameter of the microchannel to which it is connected. In some examples, the reservoir may contain from about 0.1 µl up to about 10 µl of liquid. In some examples, the reservoir has a length of at least 10 µm, 50 µm, or 100 µm, up to about 1 mm, 10 mm, 25 mm, or 50 mm; a width of at least 10 µm, 50 µm, or 100 µm up to about 500 µm, 1 mm, or 5 mm; and a height of at least 10 µm, 25 µm, or 50 µm, up to about 100 µm or 150 µm.

Figure 4:
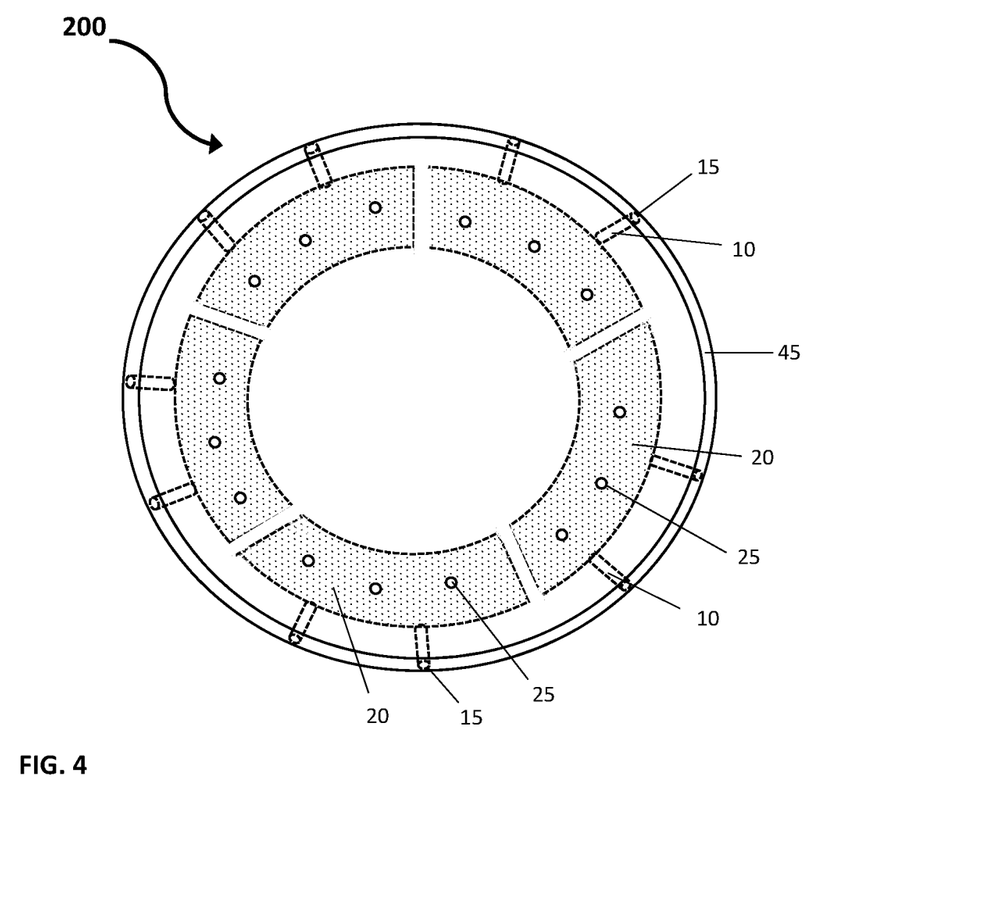
FIG. 4 depicts a top view of a contact lens comprising microchannels and reservoirs.

The reservoir is typically located outside the optic zone. In some examples, a reservoir may be arc-shaped and located around a portion of the periphery of the contact lens. A lens may have two or more arc-shaped reservoirs located around the periphery of the contact lens, such as depicted in FIG. 4. In other examples, a reservoir may comprise a single ring-like structure located within the contact lens bulk between the edge of the contact lens and the optic zone. A reservoir may be fluidly connected to one or more microchannels for distributing the liquid to other locations within the contact lens bulk or to the front or back surface of the contact lens. A microchannel to which a reservoir is connected may have an opening on the front surface, back surface, or edge of the contact lens. A reservoir may be fluidly connected to a plurality of microchannels with some of the microchannels having openings on the front surface of the contact lens, and other microchannels having openings on the back surface of the contact lens. A microchannel having an opening on the front surface of a contact lens may promote evaporation-driven capillary flow of liquid through the lens. In other examples, eyelid pressure-driven peristaltic pumping during blinking may pump liquid from the reservoir to flow into and through a microchannel. In such examples, a reservoir fluidly connected to a microchannel having an opening on the back surface of the contact lens may provide continuous moisture to the wearer's eye. In some examples, a contact lens wearer may apply manual pressure to the reservoir, such as by pressing on the lower eyelid to force liquid from the reservoir into a microchannel to provide moisture to the eye. In some examples, a contact lens may comprise a reservoir fluidly connected to a first microchannel having an opening on the front surface or edge of the contact lens, and a second microchannel having an opening on the back surface of the contact lens. In some examples, each microchannel within the contact lens is fluidly connected to a reservoir and comprises an opening on the front surface, the back surface, or the edge of contact lens.

As with the microfiber material used to form the microchannels, the reservoir may be formed by contacting a curable composition with a material having the dimensions of the desired reservoir. The same materials and methods described above for forming microfibers may be used to form reservoirs. In one example, the reservoir-forming material comprises a water-soluble polymer. The water-soluble polymer may be formed into the shape of the reservoir by any suitable method. For example, a sheet of water-soluble polymer film, such as PVOH film, may be cut into the desired shape and positioned within a contact lens mold assembly together with a curable composition and cured to form a polymeric lens body with a reservoir-forming polymer material embedded therein. In other examples, 2D or 3D printing methods, such as described above for forming microfibers, may be used to print the reservoir-forming material into the desired shape. The reservoir-forming material may be printed directly onto the contact lens mold that is predosed with a portion of the curable composition which optionally may be partially or fully cured, followed by dosing with the remainder of the curable composition and subjecting the mold to curing conditions as described previously for the formation of microchannels. In other examples, a double casting method, such as described above for forming michrochannels, may be used. Briefly, an initial amount of a curable composition is cured in a contact lens mold that comprises a raised feature on a molding surface of the mold. The resulting cured polymer has a cavity on its surface that conforms to the raised feature of the mold. The mold is opened and the cavity is filled with a reservoir-forming polymer, such as by any of the 2D or 3D printing methods mentioned above, or by placement of a polymer film into the cavity. The cured polymer is then positioned within a mold assembly together with additional curable composition, which may be the same as or different from the curable composition used in the first cast. The mold assembly is subjected to curing conditions resulting in a polymeric lens body comprising a reservoir-forming material embedded therein. In some examples, the polymeric lens body may be subject to laser ablation to form a microchannel that fluidly connects to the reservoir.

After curing, the polymeric lens body may be contacted with a solvent that dissolves the reservoir-forming material, resulting in a contact lens comprising a reservoir. In some examples, the step of contacting the polymeric lens body with a solvent results in the solubilized material being displaced by another liquid, such as a buffered saline solution used in packaging. In other examples, a solution comprising some or all of the material used to form the reservoir may be retained by the reservoir. For example, a beneficial agent may be embedded within the reservoir-forming material. During wear, the beneficial agent may flow from the reservoir through a microchannel and onto the eye of the contact lens wearer. In one example, the reservoir comprises hydroxyethyl cellulose, polyvinylpyrrolidone, polyvinyl alcohol, or hyaluronic acid, or any combination thereof. In a specific example, the reservoir comprises cross-linked hyaluronic acid. In a further example, the reservoir comprises cross-linked hyaluronic acid and a filler polymer selected from hydroxyethyl cellulose, polyvinylpyrrolidone, and polyvinyl alcohol.

Contact lenses comprising microchannels and optional reservoirs are further described below with reference to the accompanying figures, which are illustrative in nature, not necessarily drawn to scale, and not intended to be limiting to the claims.

Figure 1:
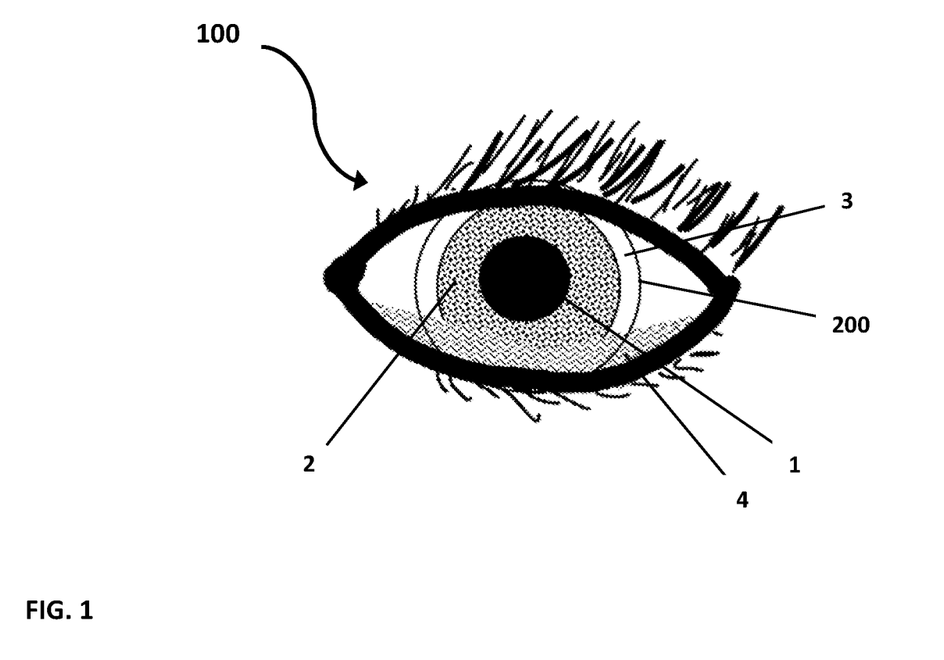
FIG. 1 depicts a human eye.

FIG. 1 depicts a human eye, 100, wearing a corneal contact lens, 200, that covers the pupil, 1, iris, 2, and a portion of the sclera, 3. The periphery of the contact lens is in contact with tears, 4, or other liquid (e.g. eye drops), that reside at the lower eyelid margin of the contact lens wearer.

Figure 2:
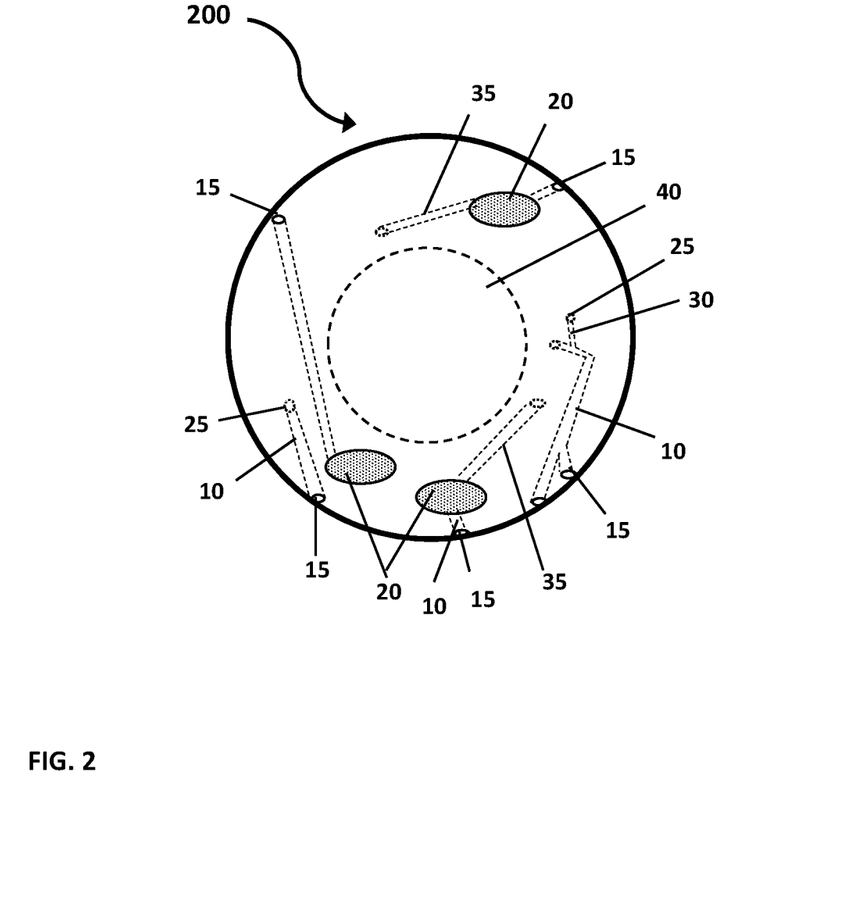
FIG. 2 illustrates various configurations of microchannels and reservoirs within a contact lens.

FIG. 2 depicts a top view of a contact lens, 200, comprising microchannels, 10, some of which are fluidly connected to reservoirs, 20, embedded within the contact lens bulk. The microchannels and reservoirs are located peripheral to the optic zone, 40. The microchannels are depicted as having a substantially cylindrical shape, but they can have any suitable shape, such as a rectangular shape, etc. Further, as an alternative to being substantially linear, as depicted, a microchannel may be curved or have any other suitable configuration. Similarly, as an alternative to having an ovoid shape, as depicted, a reservoir may have any other suitable shape, such as rectangular, square, spherical, etc.

A microchannel may be positioned in the contact lens so that it has a first opening, 15, located at the edge of the contact lens or on the periphery of the front or back surface of the contact lens (hereinafter "the periphery of the contact lens") so that the opening can contact tears residing at the lower eyelid margin of the contact lens wearer. For example, the first opening may be located within about 2.5 mm, 2.0 mm, 1.5 mm, 1.0 mm or 0.5 mm of the edge or at the edge of the contact lens. A microchannel having a first opening at the edge or periphery of the contact lens may extend through the contact lens bulk and have a second opening, 25, on the front or back surface of the contact lens that is closer to the contact lens center than the first opening. For example, a second opening may be at least 1 mm, 2 mm, or 3 mm closer to the center of the contact lens, than the first opening. In some examples, a microchannel consists of a single tube-like structure having two openings. In other examples, a microchannel may be a "branched microchannel" in that it is fluidly connected to one or more child microchannel or "microchannel branch", 30, and thus contains three or more openings. A branched microchannel may transport liquid from one or more microchannel openings in contact with a liquid at the lower eyelid margin (e.g. tears or contact lens rewetting drops) to multiple openings on the front and/or back surface of the contact lens. In some examples, a microchannel branch, 30, may have a smaller diameter than the microchannel, from which it depends to facilitate liquid transport by capillary flow. In a specific example, a branched microchannel comprises a parent microchannel that branches into two or more child microchannels where the dimensions of the parent microchannel and the child microchannels (i.e. branches) follow Murray's Law: $r_0^3 = r_1^3 + r_2^3 + \ldots + r_n^3$, where $r_0$ is the radius of the parent channel, and r n are the radii of the child branches. Such configuration may minimize resistance to liquid flow thereby increasing liquid transport efficiency.

A reservoir, 20, may be fluidly connected to a first microchannel having an opening, 15, at the periphery of the contact lens. A liquid, such as tears or contact lens rewetting drops may enter the opening, 15, and be transported through the microchannel, 10, to the reservoir, 20, by capillary action. The reservoir may be fluidly connected to a second microchannel, 35, which takes up liquid from the reservoir, such as by evaporation-driven capillary flow, eye-lid pressure driven peristaltic pumping during blinking, or by the manual application of pressure to the reservoir. The second microchannel may transport the liquid to the front or back surface of the contact lens.

Figure 3:
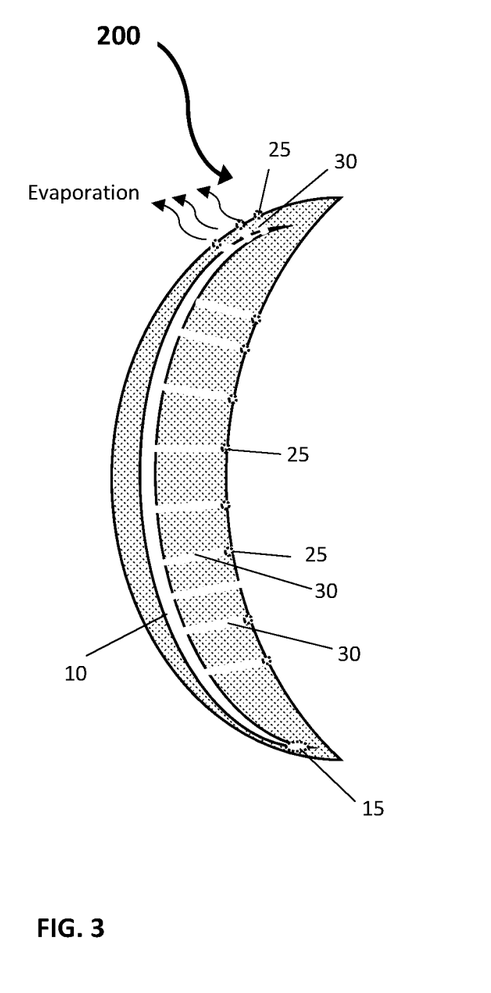
FIG. 3 depicts a side view of a contact lens comprising microchannels.

FIG. 3 depicts a cross section of a contact lens, 200, comprising a branched microchannel, 10, having an opening, 15, at the periphery of the contact lens and extending through the contact lens bulk. Microchannel branches, 30, having openings, 25, on the front surface of the contact lens, are positioned and dimensioned to promote evaporation-driven capillary flow such that tear or other liquid that access opening, 15, is transported through the parent microchannel, 10, into microchannel branches, 30, having opening, 25, at the back surface of the contact lens, thereby providing moister to the eye.

FIG. 4 depicts a top view of a contact lens, 200, comprising an array of liquid-filled reservoirs, 20, outside of the optic zone. Each reservoir, 20, is fluidly connected to two microchannels, 10, having openings, 15, on the edge, 45, of the contact lens, and three microchannels (not shown) having openings, 25, on the front or back surface of the contact lens.

Figure 5:
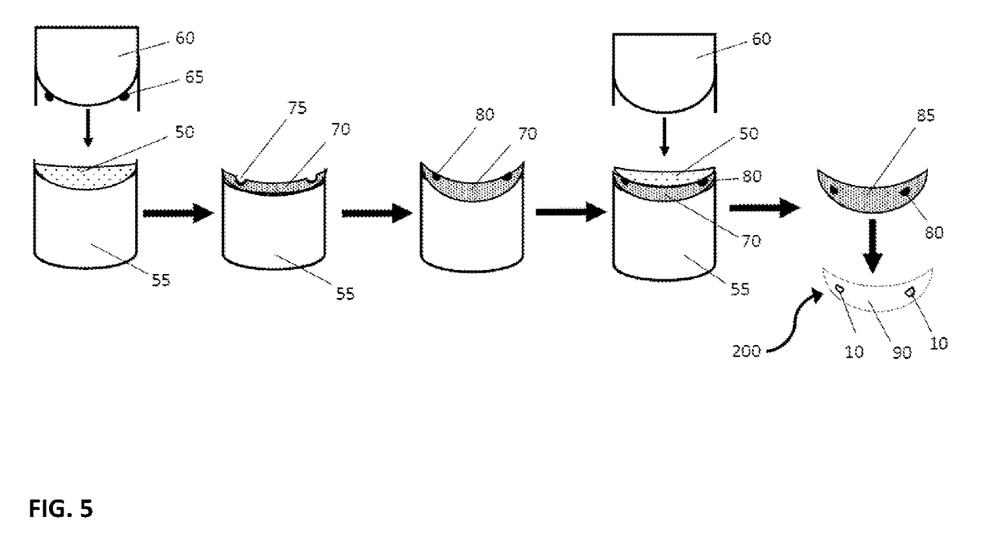
FIG. 5 depicts a double casting method for forming a contact lens with microchannels.

FIG. 5 depicts a double casting method of manufacturing a contact lens comprising microchannels in which a curable composition, 50, is dispensed into a female contact lens mold member, 55. A male contact lens mold member, 60, comprising a molding surface microstructure, 65, for forming microchannels, is combined with the female contact lens mold member. The resulting mold assembly is subjected to curing conditions. After curing, the mold assembly is disassembled and the resulting cured polymer, 70, is retained by the female mold member, 55. The concave surface of the cured polymer, 70, comprises surface microchannels, 75, that corresponding to the microstructure of the male mold member. The microchannel is filled with a microfiber material, 80, that is insoluble in the curable composition. An additional amount of the curable composition, 50, is placed in the female mold, 55, in contact with the cured polymer, 70, and microfibers, 80. The female mold member, 55, is assembled with a male contact lens mold member, 60, having a substantially smooth convex molding surface (i.e. the second mold member contains no microstructure features). The mold assembly is subjected to curing conditions to provide a polymeric lens body, 85, with the microfibers, 80, embedded therein. The polymeric lens body, 85, is contacted with a solvent to dissolve the microfiber and provide a contact lens, 200, comprising a bulk lens material, 90, defined by a front surface, a back surface, a circumferential edge, and at least one microchannel, 10, embedded within the contact lens bulk.

The following Examples illustrate certain aspects and advantages of the present invention, which should be understood not to be limited thereby.

Example 1

Microfiber and nanofiber materials were used to form microchannels in contact lenses made from a silicone hydrogel (stenofilcon A) and a silicone elastomer, Sylgard® 184

(Dow Chemical). The nanofiber material was a custom ordered material (SNS Nano Fiber Technology, Hudson, Ohio) prepared by electrospinning 88% hydrolyzed polyvinyl alcohol. It had a fiber diameter distribution range of about 0.3 µm to 6.0 µm. The microfiber material, GT30 GOHSETEX (Nippon Gohsei, Ltd. Osaka, Japan), was made from wet spinning 88% hydrolyzed polyvinyl alcohol, having a thickness of about 0.18 mm, a density of about 30 g/m$^2$, and a fiber diameter ranging from about 10 to 20 µm. Both materials were provided in sheet form.

For the silicone hydrogel lenses, the fiber material was placed in a curable composition for stenfilcon A and sonicated for about 30 minutes then vacuumed for about 15 minutes to remove remaining residual air from the fiber material. The soaked fiber material was placed in a female mold member made from polypropylene. 50 µl of the curable composition for stenfilcon A was added to the female mold member and the mold was closed with the male mold member.

The mold assembly was placed in a nitrogen oven at the following cycle: 30 min. N$_2$ purging at room temperature, 40 min. at 65° C., 40 min. at 80° C., and 40 min. at 100° C. After curing, the polymeric lens body was removed from the mold and extracted and washed by placing the lenses in four exchanges of ethanol for 15 minutes each, followed by placement in 50:50 ethanol/water for 15 minutes, then followed by 3 exchanges of water for 15 minutes each, for a total extraction/washing processing time of about 2 hours. Lenses were then placed in vials containing 3 mL PBS and autoclaved.

For the silicone elastomer lenses, Sylgard® 184 base material and curing agent were mixed together in a vial at a weight ratio of 10 (base):1 (curing agent) and vortexed for 15 minutes at 2500 rpm. The vial was placed under vacuum for 30 minutes to remove bubbles from the mixture.

Both the Sylgard® 184 and GT30 GOHSETEX materials were cut into round shapes with diameter of 11 mm, placed in the silicone elastomer mixture, sonicated for 20 minutes, and then vacuumed for about 1 hour to remove remaining residual air from the fiber material. The soaked fiber materials were removed from the elastomer mixture, lightly blotted with a wiper and placed in a female contact lens mold member made from polypropylene. 50 µl of the silicone elastomer mixture was added to the female mold member and the mold was closed with the male mold member.

The mold assembly was placed in a 100° C. oven for 3 hours. After curing, the polymeric lens body was removed from the mold and soaked in DI water for 45 min. The resulting contact lenses were then placed in vials containing 3 mL PBS and autoclaved.

Scanning electron microscopy showed the presence of interconnected microchannels and nanochannels within both the silicone hydrogel contact lenses and the silicone elastomer contact lenses, with at least some of the channels having openings at the lens surface.

Example 2

GT30 GOHSETEX (described in Example 1) was cut into the shape of an annulus having an inner diameter of 7 mm and an outer diameter of 10 mm. The microfiber annulus was soaked in a curable composition for comfilcon A and degassed under vacuum for about 1 hour.

The microfiber annulus was placed in a female mold member made from SOARLITE™ (Nippon Gohsei, Ltd., Osaka, Japan), a thermoplastic ethylene-vinyl alcohol copolymer. 50 µl of comfilcon A was added to the female mold and the mold was closed with the male mold member.

The mold assembly was placed in a UV oven for 60 minutes to cure the comfilcon A. The mold assembly was soaked in a 77° C. waterbath for about 10 minutes and the molds were separated. The mold half retaining the polymeric lens body was soaked for about 5 more minutes in the waterbath until the lens detached from the mold. The lenses were extracted, washed and autoclaved as described in Example 1.

Scanning electron microscopy showed the presence of interconnected microchannels and nanochannels, with at least some of the channels having openings at the lens surface.

Example 3

Polymer films of formulations A, B and C, shown in Table 1 below, were prepared. The following abbreviations are used:

HEC 250M: Natrosol™ 250 hydroxyethylcellulose, viscosity type M.
HA: hyaluronic acid, Mw~600K.
BDDE: 1,4-butanediol diglycidyl ether.
HEC 250L: Natrosol™ 250 hydroxyethylcellulose, viscosity type L.

The films were cut into 6 mm diameter circles and placed on top of a polypropylene male contact lens mold member having a 2.5 mm wide by projection in the center of the optic zone region of the mold for placement of the film. A monomer mixture comprising 2-hydroxyethyl methacrylate, 2-methacryoyloxyethyl phosphorylcholine, ethyleneglycol dimethacrylate, and a thermal polymerization initiator was dispensed into the female mold members and the molds were closed with the male mold members having the polymer films adhered thereto. The molds were placed in a 100° C. oven for 30 minutes. After curing, the molds were opened and the lenses were removed and hydrated.

| component | A | B | C |
|---|---|---|---|
| HEC 250M | 50 parts | 22 parts | 22 parts |
| HA | 50 parts | 22 parts | 22 parts |
| BDDE | 0.05 molar | 0.05 molar | 0.05 molar |
| HEC 250L | — | 56 parts | — |
| G-Polymer | — | — | 56 parts |

Polymer films of formulation A swelled to a greater extent than the contact lens bulk material and caused significant distortion to the lenses. Addition of HEC 250L or G-polymer to the polymer film reduced the swelling rate of the film, which more closely matched that of the contact lens bulk material.

The disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

The entire contents of all cited references in this disclosure, to the extent that they are not inconsistent with the present disclosure, are incorporated herein by reference.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A contact lens comprising:
   a) a bulk polymer material defined by a front surface, a back surface, and a circumferential edge; and
   b) at least one microchannel embedded within the bulk polymer material having a first opening located within 1.5 mm of the circumferential edge, and a second opening on the front surface or the back surface and located more than 2 mm away from the circumferential edge, wherein
   when worn, the at least one microchannel transports liquid from a lower tear meniscus of an eye through the contact lens bulk to a location on the front surface or the back surface of the contact lens that is not in contact with the lower tear meniscus.

2. The contact lens of claim 1, wherein the first opening is located within 1.0 mm of the circumferential edge.

3. The contact lens of claim 1, wherein the first opening is located at or within 0.5 mm of the circumferential edge.

4. The contact lens of claim 1, wherein the second opening is on the front surface.

5. The contact lens of claim 1, wherein the second opening is on the back surface.

6. The contact lens of claim 1, wherein the at least one microchannel is cylindrical in shape and has an average diameter of from 500 nm to 50 μm or is rectangular in shape with a height of from 5 μm to 50 μm and a width of from 5 μm to 5 mm.

7. The contact lens of claim 1, wherein the at least one microchannel is a branched microchannel comprising a main microchannel and a plurality of branches fluidly connected to the main microchannel.

8. The contact lens of claim 7, wherein the main microchannel has the first opening, one of the plurality branches has the second opening, and a remainder of the plurality of branches has a respective other opening.

9. The contact lens of claim 7, wherein the plurality of branches each comprise a respective diameter smaller than a diameter of the main microchannel.

10. The contact lens of claim 7, wherein the branched microchannel follows Murray's Law: $r_0^3 = r_1^3 + r_2^3 + \ldots + r_n^3$, where $r_0$ is the radius of the main microchannel, and $r_1, \ldots, r_n$ are the radii of the plurality of branches depending from the main microchannel.

11. The contact lens of claim 1, wherein the bulk polymer material comprises a silicone hydrogel.

12. The contact lens of claim 1, wherein the bulk polymer material comprises a silicone elastomer.

13. The contact lens of claim 1, wherein the at least one microchannel comprises a plurality of microchannels.

14. The contact lens of claim 1, wherein the at least one microchannel does not intersect with any other microchannel.

15. The contact lens of claim 1, wherein the at least one microchannel is not present within an optic zone of the contact lens.

16. The contact lens of claim 1, further comprising at least one reservoir fluidly connected to the at least one microchannel, wherein the at least one reservoir has a length of 10 μm to 50 mm, a width of 10 μm to 5 mm, and a height of 10 μm to 150 μm.

17. The contact lens of claim 16, wherein the at least one reservoir is fluidly connected to a second microchannel embedded within the bulk polymer material.

18. The contact lens of claim 16, wherein the at least one reservoir comprises an array of reservoirs, wherein each of the array of reservoirs is fluidly connected to at least one of the at least one microchannel and another microchannel.

19. The contact lens of claim 16, wherein the reservoir contains a liquid comprising hydroxyethyl cellulose, polyvinylpyrrolidone, polyvinyl alcohol, hyaluronic acid, or any combination thereof.

20. The contact lens of claim 16, wherein the reservoir contains hyaluronic acid and a polymer selected from hydroxyethyl cellulose, polyvinylpyrrolidone, and polyvinyl alcohol.

* * * * *